(12) United States Patent
Kaneko et al.

(10) Patent No.: US 8,429,129 B2
(45) Date of Patent: Apr. 23, 2013

(54) DATABASE RESTRUCTURING APPARATUS, AND COMPUTER-READABLE RECORDING MEDIUM RECORDING DATABASE RESTRUCTURING PROGRAM

(75) Inventors: Kenji Kaneko, Kawasaki (JP); Takafumi Katsume, Kawasaki (JP); Hisayuki Enbutsu, Kawasaki (JP); Mikio Kurosaka, Kawasaki (JP); Shinichi Takaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 11/322,042

(22) Filed: Dec. 28, 2005

(65) Prior Publication Data

US 2007/0033236 A1    Feb. 8, 2007

(30) Foreign Application Priority Data

Aug. 4, 2005 (JP) ................................. 2005-226067

(51) Int. Cl.
*G06F 7/00* (2006.01)
*G06F 17/00* (2006.01)
(52) U.S. Cl.
USPC .......................................... 707/640; 707/674
(58) Field of Classification Search ................... 707/204, 707/640, 674
See application file for complete search history.

(56) References Cited

U.S. PATENT DOCUMENTS

| | | | | |
|---|---|---|---|---|
| 5,537,585 | A | * | 7/1996 | Blickenstaff et al. ......... 707/202 |
| 6,377,959 | B1 | * | 4/2002 | Carlson ......................... 707/202 |
| 2004/0215637 | A1 | | 10/2004 | Kitamura et al. |
| 2005/0246385 | A1 | * | 11/2005 | Nishino et al. ................ 707/200 |

FOREIGN PATENT DOCUMENTS

| | | |
|---|---|---|
| JP | 04-088440 | 3/1992 |
| JP | 6-075840 | 3/1994 |
| JP | 10-207754 | 8/1998 |
| JP | 2000-222258 | 8/2000 |
| JP | 2003-006020 | 1/2003 |
| JP | 2004-132350 | 4/2004 |
| JP | 2004-318288 | 11/2004 |
| JP | 2005-065347 | 3/2005 |
| JP | 2005-253500 | 9/2005 |
| JP | 2005-316624 | 11/2005 |

OTHER PUBLICATIONS

Partial translation of Japanese Office Action issued Nov. 16, 2010 for Japanese Application No. 2005-226067.

\* cited by examiner

*Primary Examiner* — Apu Mofiz
*Assistant Examiner* — Chelcie Daye
(74) *Attorney, Agent, or Firm* — Greer, Burns & Crain, Ltd.

(57) ABSTRACT

A database restructuring apparatus which is capable of migrating a database without depending on a method of managing the database and without interrupting practical online services. Copying section copies data from a current database to a switching destination database. When data update access to the current database by current database access section occurs during copy processing by the copying section, data updating section determines whether or not data to be accessed has been copied. If the data has not been copied yet, the data updating section performs data update processing on the current database, whereas if the data has already been copied, the data updating section performs data update processing on both the current database and the switching destination database. After completion of the copy processing, switching section switches the distribution destination of an online electronic message to switching destination database access section.

6 Claims, 14 Drawing Sheets

DATABASE RESTRUCTURING APPARATUS, AND COMPUTER-READABLE RECORDING MEDIUM RECORDING DATABASE RESTRUCTURING PROGRAM

CROSS-REFERENCE TO RELATED APPLICATIONS

This application is based upon and claims the benefits of priority from the prior Japanese Patent Application No. 2005-226067, filed on Aug. 4, 2005, the entire contents of which are incorporated herein by reference.

BACKGROUND OF THE INVENTION

1. Field of the Invention

This invention relates to a database restructuring apparatus for restructuring a database, and a computer-readable recording medium recording a database restructuring program, and more particularly to a database restructuring apparatus configured to reduce online service interruption time, and a computer-readable recording medium recording a database restructuring program.

2. Description of the Related Art

When the capacity of a database becomes insufficient, the database is restructured. However, in order to physically restructure the database, it is required to temporarily save data from the database and then store the data in the database again. Therefore, if the database is a large-scale one, it takes a long time to save and store the data again. For this reason, it is difficult to restructure database while providing online services for which a response within a predetermined time period is required to be always ensured.

In general, physical restructuring of a database during online operation is given up, and instead, the operation of expanding the database is executed in an online service interruption time period e.g. on weekends. In this case, however, if there occur more online jobs than expected, the capacity of the database can become insufficient during execution of online operation. If the capacity of the database runs short during online operation, it is impossible thereafter to continue online transactions, which causes a great deal of inconvenience to users.

To cope with this problem, a method is generally employed in which a margin is given to the storage capacity of a database so as to prevent the capacity of the database from becoming insufficient before weekends. In this case, however, the database has to secure a larger storage capacity than necessary, which causes degradation of utilization efficiency of resources.

There have also been proposed various techniques for restructuring a database while minimizing service interruption time (see e.g. Japanese Unexamined Patent Publication Nos. 06-75840, 10-207754, and 2003-6020).

However, in the inventions disclosed in Japanese Unexamined Patent Publication Nos. 06-75840, 10-207754, and 2003-6020, it is required to store an update log associated with services provided during database restructuring, and reflect the update log in the restructured database. For this reason, a service is inevitably interrupted during execution of processing for reflecting the update log in the database. Further, as the database is larger, it takes longer to migrate data, and the data amount of update logs becomes large. As a result, time required for reflecting the update logs in the restructured database increases, which prolongs a service interruption time period.

It should be noted that the present assignee has proposed in Japanese Patent Application No. 2004-132350, a database restructuring method which is capable of restructuring a database without interrupting services. However, this invention targets only an index-based database, and because not every database is managed by the index-based method, the applicability of the invention is limited.

SUMMARY OF THE INVENTION

The present invention has been made in view of the above problems, and an object thereof is to provide a database restructuring apparatus which is capable of migrating a database without depending on the method of managing the database and practically without interrupting online services, and a computer-readable recording medium recording a database restructuring program.

To attain the above object, there is provided a database restructuring apparatus for migrating a current database in a first volume to a second volume. This database restructuring apparatus comprises current database access section operable when an online electronic message is input, to specify a physical position in the current database using a current schema defining a data structure of the current database, and access the current database, switching destination database-creating section for creating a switching destination database in the second volume and generating a switching destination schema defining a data structure of the switching destination database, switching destination database access section operable when an online electronic message is input, to specify a physical position in the switching destination database using the switching destination schema, and access the switching destination database, copying section for copying data from the current database to the switching destination database, data updating section operable when data update access to the current database by the current database access section occurs during copy processing by the copying section, to determine whether or not data to be accessed has been copied, and if the data has not been copied yet, to perform data update processing on the current database, while if the data has already been copied, to perform data update processing on both the current database and the switching destination database, and switching section for distributing online electronic messages input during copy processing by the copying section to the current database access section, and after completion of the copy processing, switching a distribution destination of online electronic messages to the switching destination database access section.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The present invention will now be described in detail with reference to the accompanying drawings showing a preferred embodiment thereof.

Figure 1:
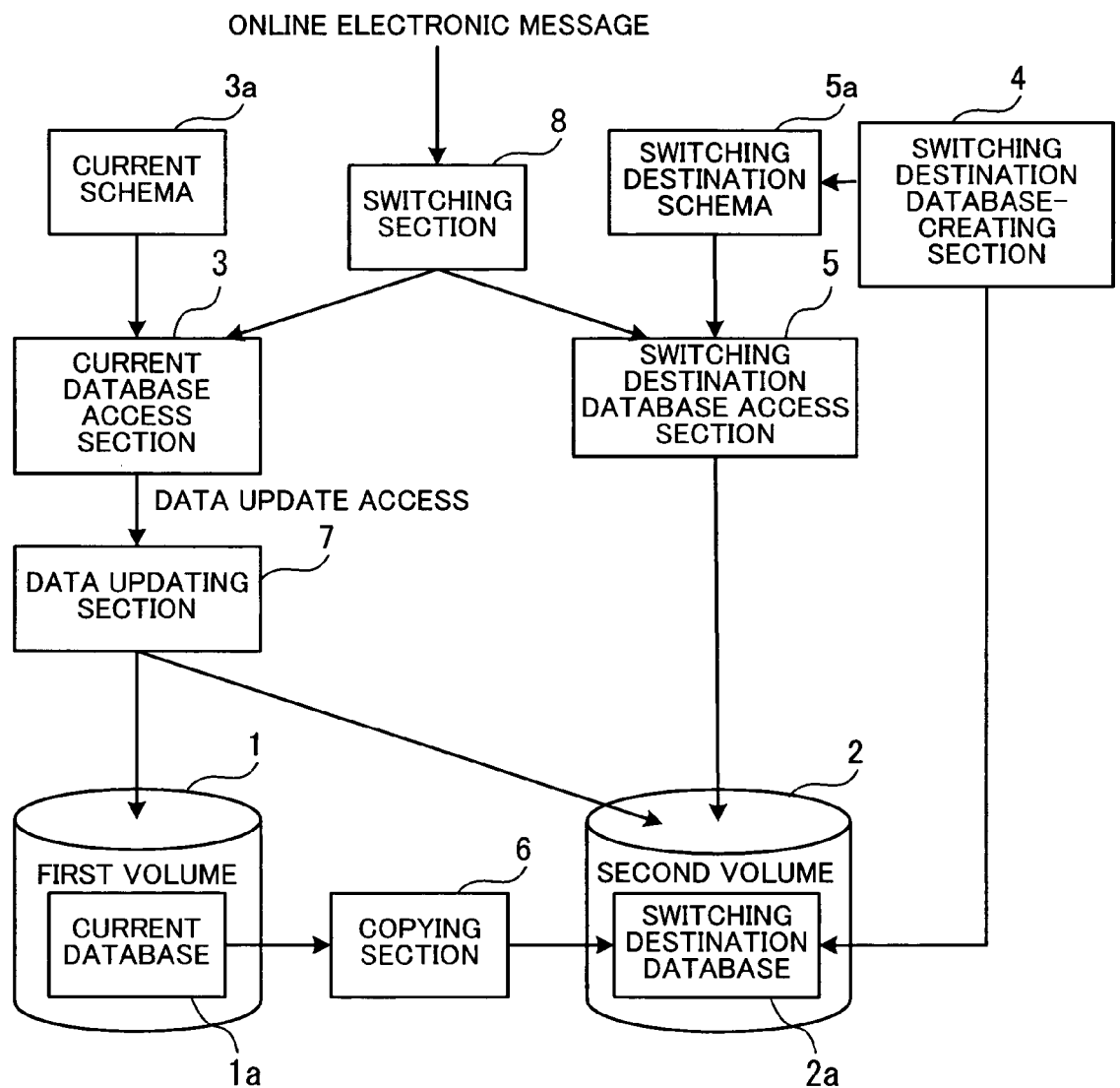
FIG. 1 is a diagram showing the outline of the present embodiment.

FIG. 1 is a diagram showing the outline of the present embodiment. To migrate a current database 1a from a first volume 1 to a second volume 2, a database restructuring apparatus according to the present embodiment is comprised of a current database access section 3, a switching destination database-creating section 4, a switching destination database access section 5, a copying section 6, a data updating section 7, and a switching section 8.

When an online electronic message is input, the current database access section 3 accesses the current database 1a by specifying a physical position in the current database 1a using a current schema 3a defining the data structure of the current database 1a. More specifically, the current database access section 3 uses the current schema 3a to recognize the physical position of data in the first volume 1 designated by the online electronic message, and accesses the data corresponding to the position.

The switching destination database-creating section 4 creates a switching destination database 2a in the second volume 2, and generates a switching destination schema 5a defining the data structure of the switching destination database 2a.

When an online electronic message is input, the switching destination database access section 5 specifies a physical position in the switching destination database 2a using the switching destination schema 5a, and accesses the switching destination database 2a. More specifically, the switching destination database access section 5 recognizes the physical position of data in the second volume 2 designated by the online electronic message, based on the switching destination schema 5a, and accesses the data corresponding to the position.

The copying section 6 copies data from the current database 1a to the switching destination database 2a. For example, the copying section 6 sequentially performs copying of data of the current database 1a in the first volume 1, starting with a data item corresponding to a start address of the area of the current database 1a. In this case, the copying section 6 sets an address corresponding to a final data item ever copied, as final copy address information, to thereby notify the data updating section 7 of the status of the progress of copying.

When data update access to the current database 1a is performed by the current database access section 3 during execution of the copy processing by the copying section 6, the data updating section 7 determines whether or not data to be accessed has been copied yet. For example, if an address to be accessed by the data update access is not larger than the address set as the final copy address information, it is determined that the data corresponding to the address has already been copied. On the other hand, if the address to be accessed by the data update access is larger than the address set as the final copy address information, the data updating section 7 determines that the data corresponding to the address has not been copied yet.

When the data to be accessed has not been copied yet, the data updating section 7 performs data update processing on the current database 1a. On the other hand, when data to be accessed has already been copied, the data updating section 7 performs data update processing on both the current database 1a and the switching destination database 2a.

During execution of copy processing by the copying section 6, the switching section 8 distributes input online electronic messages to the current database access section 3. After completion of the copy processing by the copying section 6, the switching section 8 switches the distribution destination of online electronic messages to the switching destination database access section 5.

According to the thus configured database restructuring apparatus, the switching destination database-creating section 4 creates the switching destination database 2a in the second volume 2, and generates the switching destination schema 5a defining the data structure of the switching destination database 2a. Thereafter, data in the current database 1a is copied to the switching destination database 2a by the copying section 6.

When an online electronic message input during execution of the copy processing by the copying section 6 is distributed to the current database access section 3 by the switching section 8, the current database access section 3 specifies a physical address in the current database 1a using the current schema 3a defining the data structure of the current database 1a, and accesses the current database 1a. At this time, the data updating section 7 determines whether or not data to be accessed has been coped yet. If the data has not been copied yet, data update processing is performed on the current database 1a. On the other hand, if the data has already been copied, update processing is performed on both the current database 1a and the switching destination database 2a.

Thereafter, when the copy processing is completed, the switching section 8 switches the distribution destination of online electronic messages to the switching destination database access section 5. From then on, each online electronic message is input to the switching destination database access section 5, and the switching destination database access section 5 accesses the switching destination database 2a by specifying a physical position in the switching destination database 2a using the switching destination schema 5a.

Thus, it is possible to achieve database migration practically without interrupting online services and without depending on the data structure of the database. More specifically, a service interruption time period may be no longer than a time period required for switching processing for switching the distribution destination of online electronic messages to the switching destination database access section 5. Therefore, even a large-scale database needs only a very short service interruption time. As a result, practically, it is not required to interrupt online services.

Further, if data to be accessed by data update access (which designates a physical address) output from the current database access section 3 has already been copied, synchronous data update processing is performed on both the current database 1a and the switching destination database 2a. For this reason, database restructuring is realized by a rather hardware-based function based on the database access performed using the schema. More specifically, volume access performed by specifying a physical address is under the control of an OS (Operating System) but not dependent on application software used for the database. This makes database restructuring possible without regard to a method of database management by host application software.

Next, a detailed description will be given of the present embodiment.

Figure 2:
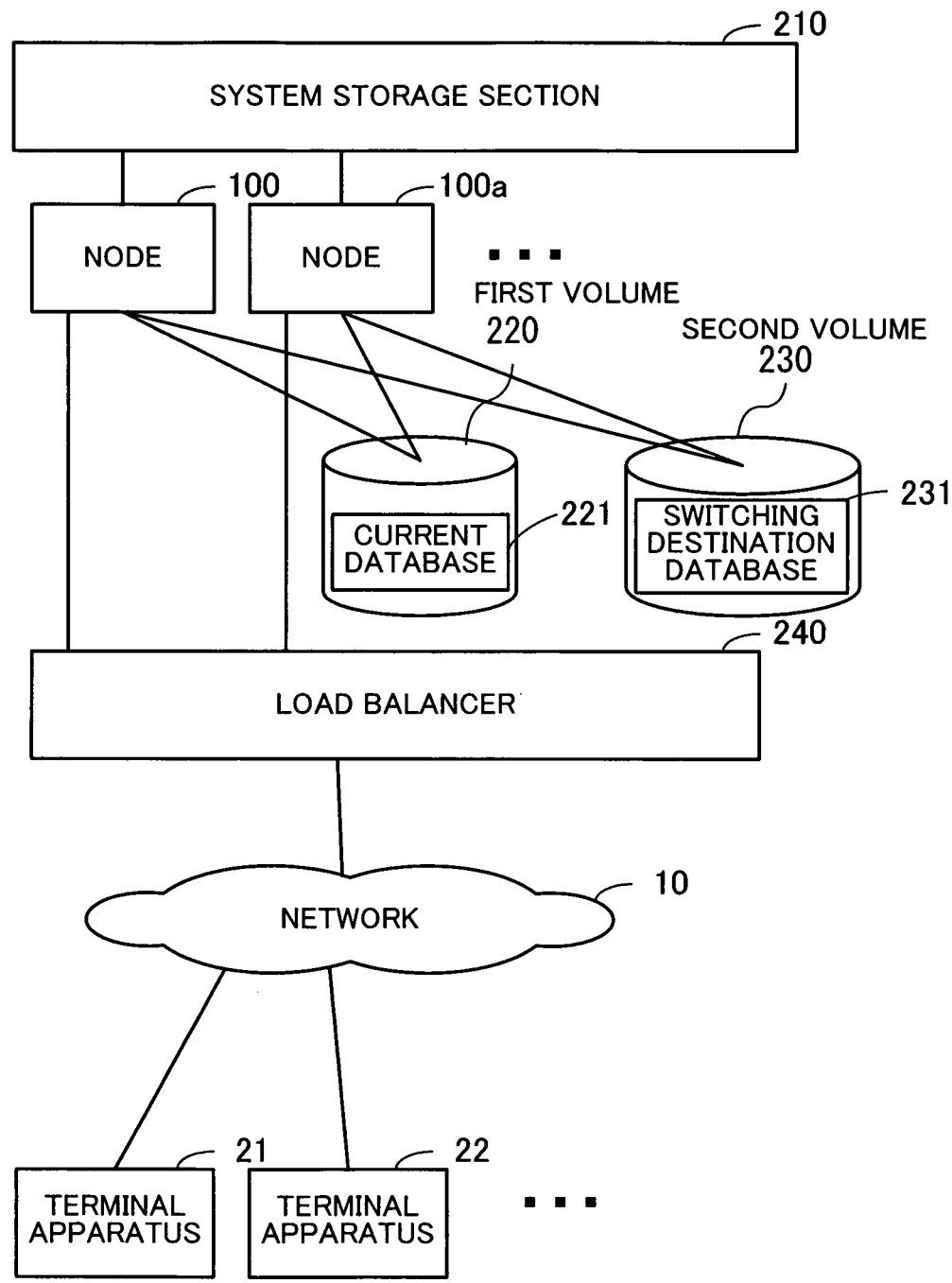
FIG. 2 is a diagram showing the configuration of a system of the present embodiment by way of example.

FIG. 2 is a diagram showing the configuration of a system of the present embodiment by way of example. The system according the present embodiment incorporates a cluster formed by a plurality of nodes 100, 100a, . . . . The nodes 100, 100a, . . . are computers each of which performs data processing involving database access, in response to a processing request input via an online electronic message. The nodes 100, 100a, . . . are connected to a sharable system storage section 210 so as to share information via the system storage section 210.

Further, the nodes 100, 100a, . . . are connected to a first volume 220 and a second volume 230. The first volume 220 and the second volume 230 are data storage areas defined in respective hard disk drives (HDD: Hard Disk Drives). In the first volume 220, there is constructed a current database 221. In the second volume 230, a switching destination database 231 is constructed for database restructuring.

Each of the nodes 100, 100a, . . . accepts an online electronic message via a load balancer 240. The load balancer 240 monitors the load of each of the nodes 100, 100a, . . . . The load balancer 240 receives an online electronic message from one of terminal apparatuses 21, 22, . . . , via a network 10 and transfers the online electronic message to a node deemed to be appropriate in terms of load thereon.

The terminal apparatuses 21, 22, . . . are computers used by users.

Figure 3:
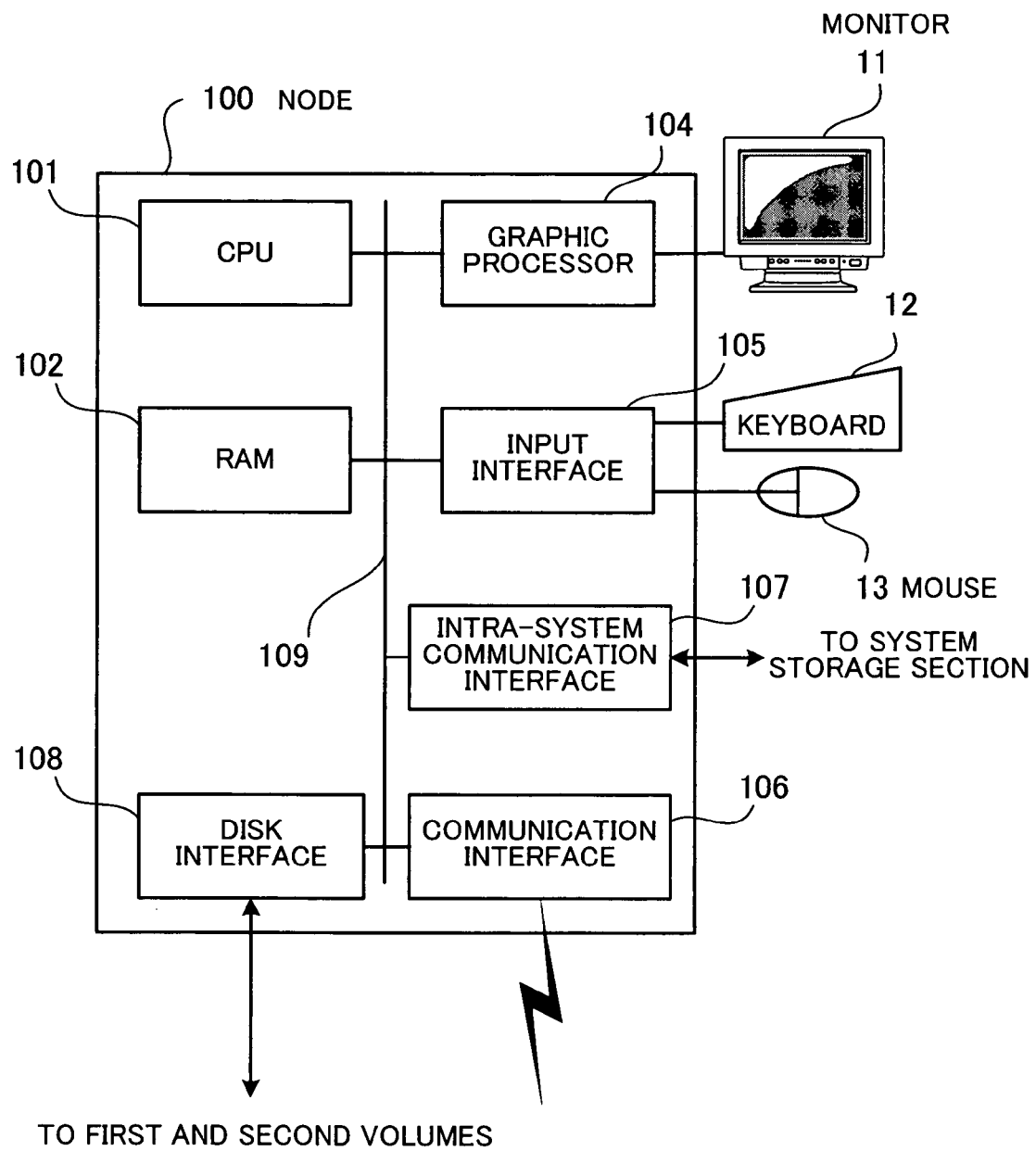
FIG. 3 is a diagram showing a hardware configuration of a node used in the present embodiment, by way of example.

FIG. 3 is a diagram showing a hardware configuration of the node used in the present embodiment, by way of example. The whole system of the node 100 is controlled by a CPU (Central Processing Unit) 101. A RAM (Random Access Memory) 102, a graphic processor 104, an input interface 105, a communication interface 106, an intra-system communication interface 107, and a disk interface 108 are connected to the CPU 101 via a bus 109.

The RAM 102 temporarily stores at least part of the OS and application programs executed by the CPU 101. Further, the RAM 102 stores various data necessitated in processing by the CPU 101.

The graphic processor 104 is connected to a monitor 11. The graphic processor 104 displays an image on the screen of the monitor 11 in response to instructions from the CPU 101. A keyboard 12 and a mouse 13 are connected to the input interface 105. The input interface 105 sends signals input from the keyboard 12 and the mouse 13 to the CPU 101 via the bus 109.

The communication interface 106 is connected to various networks. The communication interface 106 performs transmission and reception of data to and from other computers via the networks.

The intra-system communication interface 107 is connected to the system storage section 210, for inputting and outputting data to and from the system storage section 210.

The disk interface 108 provides interface for inputting and outputting data to and from the first and second volumes 220 and 230.

The hardware configuration described above can realize the processing capabilities of the present embodiment. Although FIG. 3 shows the hardware configuration of the node 100 alone, it is also possible to realize the other nodes 100a, . . . by the same hardware configuration.

Figure 4:
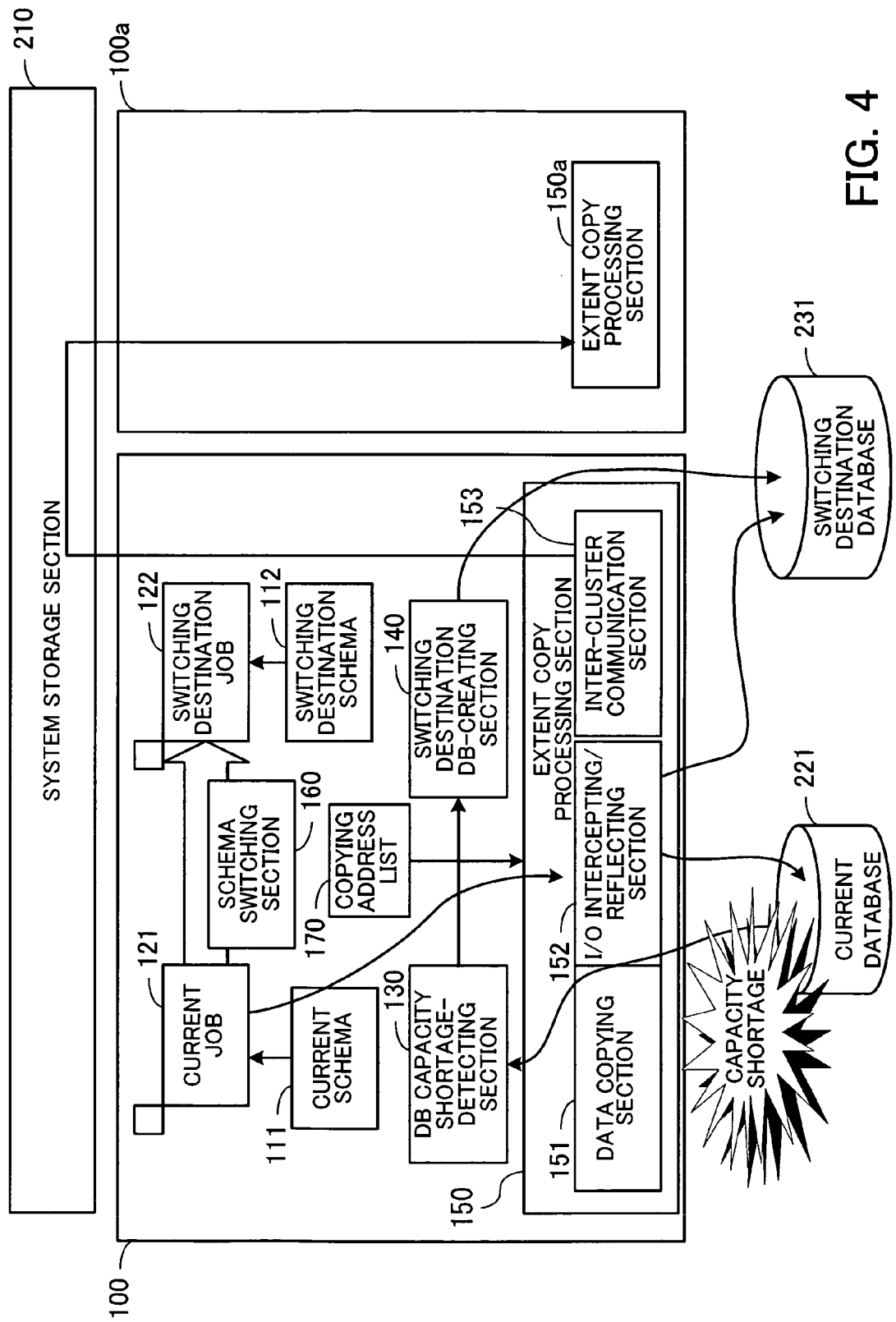
FIG. 4 is a block diagram useful in explaining a database restructuring function of the node.

FIG. 4 is a block diagram useful in explaining a database restructuring function of each node. The node 100 is provided with a current schema 111 defining the data structure of the current database 221, and a switching destination schema 112 defining the data structure of the switching destination database 231. It should be noted that the current schema 111 is prepared at the start of system operation using the current database 221. The switching destination schema 112 is set in the node 100 by an administrator or the like before execution of database restructuring from the current database 221 to the switching destination database 231.

A current job 121 accesses the current database 221 using the current schema 111, in response to a processing request issued via an online electronic message. A switching destination job 122 accesses the switching destination database 231 using the switching destination schema 112, in response to a processing request issued via an online electronic message.

A database capacity shortage-detecting section 130 monitors the use of the current database 221 and determines, at appropriate times, whether or not the available capacity of the current database 221 is insufficient. For example, an available capacity to be constantly maintained (a minimum available capacity) is preset in the database capacity shortage-detecting section 130, and when the available capacity of the first volume 220 in which the current database 221 is constructed becomes equal to or smaller than the minimum available capacity, the databasae capacity shortage-detecting section 130 determines that the available capacity of the current database 221 is insufficient. When the available capacity of the current database 221 becomes insufficient, the database capacity shortage-detecting section 130 notifies a switching destination database-creating section 140 of the fact.

When notified of the capacity shortage of the current database 221, the switching destination database-creating section 140 creates the switching destination database 231 which has been initialized, in the second volume 230. It should be noted that the switching destination database 231 has a physical structure (storage volume, physical position, and capacity) changed from that of the current database 221. For example, the switching destination database 231 has an increased database capacity. At this time, the switching destination database-creating section 140 integrates the switching destination schema 112 including information on the switching destination database 231 into the system.

An extent copy processing section 150 copies data from the current database 221 to the initialized switching destination database 231, while allowing the online processing to be in operation. Only after data contained in the current database 221 is thus copied to the initialized switching destination database 231 which has been restructured, the restructured switching destination database 231 can be used as a destination to be accessed based on an online electronic message. The extent copy processing section 150 is provided with a data copying section 151, an I/O intercepting/reflecting section 152, and an inter-cluster communication section 153 so as to achieve the above-mentioned extent copy during online processing.

After the switching destination database 231 is created, the data copying section 151 copies data from the current database 221 to the switching destination database 231.

To enable data copying during online processing involving database update, the I/O intercepting/reflecting section 152 intercepts an update I/O for the current database 221 during and after copying, and reflects the same in the switching destination database 231 in a synchronizing manner. More specifically, extent copy includes two phases: an initial copying phase and an equivalence-maintaining phase.

In the initial copying phase, data are sequentially copied from the current database 221 to the switching destination database 231 on a predetermined unit basis (e.g. on a track-by-track basis). If an update I/O for the current database 221 occurs in the current job 121 during the copy processing, the I/O intercepting/reflecting section 152 determines whether or not a data area to be accessed has been copied yet. If the data area has not been copied yet, the I/O intercepting/reflecting section 152 performs the update I/O for the current database 221. On the other hand, if the data area has already been copied, the update I/O is reflected in both the current database 221 and the switching destination database 231 in a synchronizing manner.

In the equivalence-maintaining phase, the I/O intercepting/reflecting section 152 reflects an update request issued to the current database 221 in both the current database 221 and the switching destination database 231 in a synchronizing manner.

The inter-cluster communication section 153 communicates with an extent copy processing section 150a of each of the other nodes including the node 100a to exchange information on extent copy. For example, when extent copy is started, the inter-cluster communication section 153 notifies the extent copy processing section 150a of the other nodes including the node 100a of the fact. As a consequence, also in each of the other nodes including the node 100a, when an update I/O for the current database 221 occurs, the update I/O is reflected in both the current database 221 and the switching destination database 231 in a synchronizing manner. Further, the inter-cluster communication section 153 delivers information indicative of the status of the progress of copying carried out by the data copying section 151 to the extent copy processing section 150. This enables the node 100a as well to determine whether or not data to be subjected to the update I/O has been copied.

A schema switching section 160 switches the schema for on-job use from the current schema 111 to the switching destination schema 112 so as to enable on-line use of the switching destination database 231 after copying. It should be noted that schema switching is required to be performed while continuing online transaction, but schemas different in generation cannot be used simultaneously in a single job. For this reason, the schema switching section 160 previously starts the current job 121 and the switching destination job 122 corresponding to the respective schemas 111 and 112, in parallel with each other, and switches the job to which online electronic messages are to be distributed to the switching destination job 122 when data copying is completed. Thus, schema switching is achieved.

Further, in switching the job to which online electronic messages are to be distributed, the updated state of the current database 221 and that of the switching destination database 231 are required to be equivalent to each other. To this end, the schema switching section 160 temporarily inhibits execution of update processing on the current database 221 and the switching destination database 231, for job switching. All processing to be carried out for job switching is to complete processing of an update I/O for the current database 221 and the switching destination database 231 and execute distribution of online electronic messages. Therefore, an update inhibition time period can be considerably reduced.

The status of the progress of copying is managed by a copying address list 170. The copying address list 170 stores information indicative of the extent of the current database 221 and that of the switching destination database 231, and information indicative of a copied area of the current database 221. The copying address list 170 is shared with the other nodes including the node 100a via the inter-cluster communication section 153.

Figure 5:
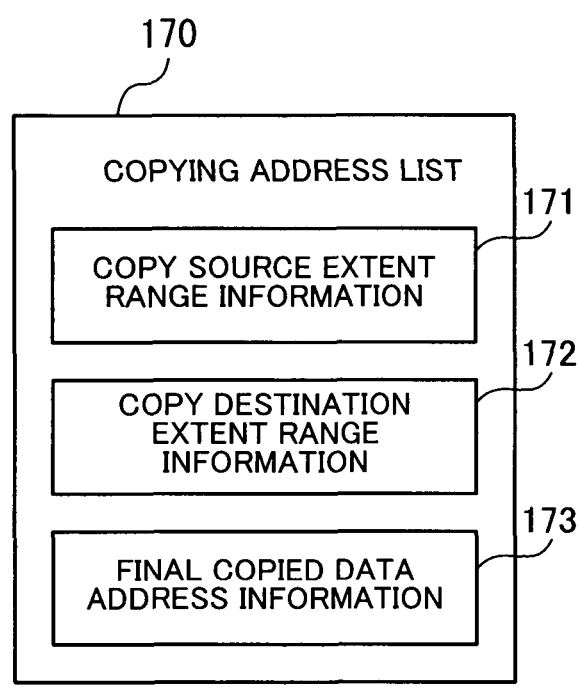
FIG. 5 is a diagram useful in explaining contents of a copying address list.

FIG. 5 is a diagram useful in explaining contents of the copying address list. The copying address list 170 contains copy source extent range information 171, copy destination extent range information 172, and final copied data address information 173.

In the copy source extent range information 171, there is set information indicative of the data storage area of the current database 221. For example, the range of extent of the current database 221 is indicated by the start address of the current database 221 in the first volume 220 and the capacity of the current database 221.

In the copy destination extent range information 172, there is set information indicative of the data storage area of the switching destination database 231. For example, the range of extent of the switching destination database 231 is indicated by the start address of the switching destination database 231 in the second volume 230 and the capacity of the switching destination database 231.

The final copied data address information 173 indicates a range of copied data of the current database 221. In the present embodiment, data in the current database 221 are sequentially copied to the switching destination database 231 from a location corresponding to the start address. Therefore, the final copied data address information 173 is set to the address of final data copied. This makes it possible to determine that the area corresponding to the addresses with smaller values than the final copied data address information 173 has already been copied, and the area corresponding to the addresses with larger values than the same has not been copied yet.

Next, the procedure of an extent copy process will be described with reference to FIG. 6.

Figure 6:
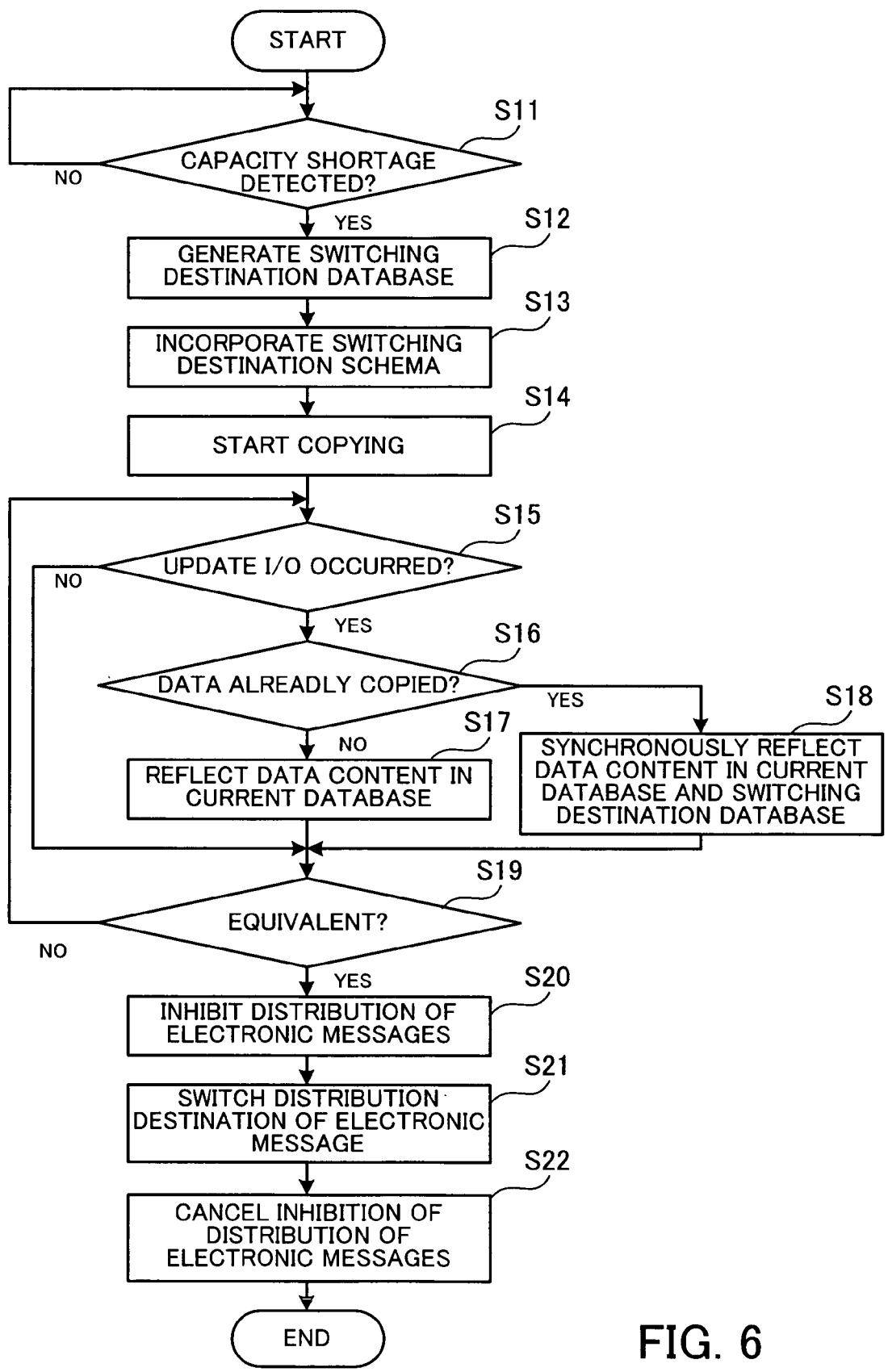
FIG. 6 is a flowchart showing the procedure of an extent copy process.

FIG. 6 is a flowchart showing the procedure of the extent copy process. In the following, the process shown in FIG. 6 will be described in the order of step numbers.

[Step S11] The database capacity shortage-detecting section 130 determines whether or not the shortage of the available capacity of the first volume 220 having the current database 221 formed therein has been detected. If the shortage of the available capacity has been detected, the process proceeds to a step S12. On the other hand, if the available capacity is sufficient, the step S11 is repeatedly carried out, with the current database 221 being continuously monitored.

[Step S12] The switching destination database-creating section 140 creates the switching destination database 231 in the second volume 230, and initializes the switching destination database 231.

[Step S13] The switching destination database-creating section 140 incorporates the switching destination schema 112 defining the data structure of the switching destination database 231 into the system.

[Step S14] The data copying section 151 starts copying data from the current database 221 to the switching destination database 231.

[Step S15] The I/O intercepting/reflecting section 152 determines whether or not an update I/O has been output from the current job 121. If an update I/O has been output, the process proceeds to a step S16, whereas if not, the process proceeds to a step S19.

[Step S16] The I/O intercepting/reflecting section 152 determines whether or not data in a storage area targeted by the update I/O has been copied to the switching destination database 231. If the data has been copied, the process proceeds to a step S18. If not, the process proceeds to a step S17.

[Step S17] The I/O intercepting/reflecting section 152 writes data in the current database 221 according to the update I/O to thereby reflect contents of the data in the current database 221, followed by the process proceeding to the step S19.

[Step S18] The I/O intercepting/reflecting section 152 writes data in the current database 221 and the switching destination database 231 according to the update I/O to thereby reflect contents of the data in both the current database 221 and the switching destination database 231 simultaneously.

[Step S19] The schema switching section 160 determines whether or not the current database 221 and the switching destination database 231 have become equivalent to each other after completion of extent copy. If the current database 221 and the switching destination database 231 have become equivalent to each other, the process proceeds to a step S20, whereas if not, the process returns to the step S15.

[Step S20] The schema switching section 160 inhibits distribution of online messages sent from the terminal apparatuses 21, 22, . . . .

[Step S21] The schema switching section 160 switches the distribution destination of online messages to the switching destination job 122 that performs database access based on the switching destination schema 112.

[Step S22] The schema switching section 160 cancels inhibition of distribution of online messages.

Thus, database restructuring can be achieved practically without interrupting online services.

Figure 7:
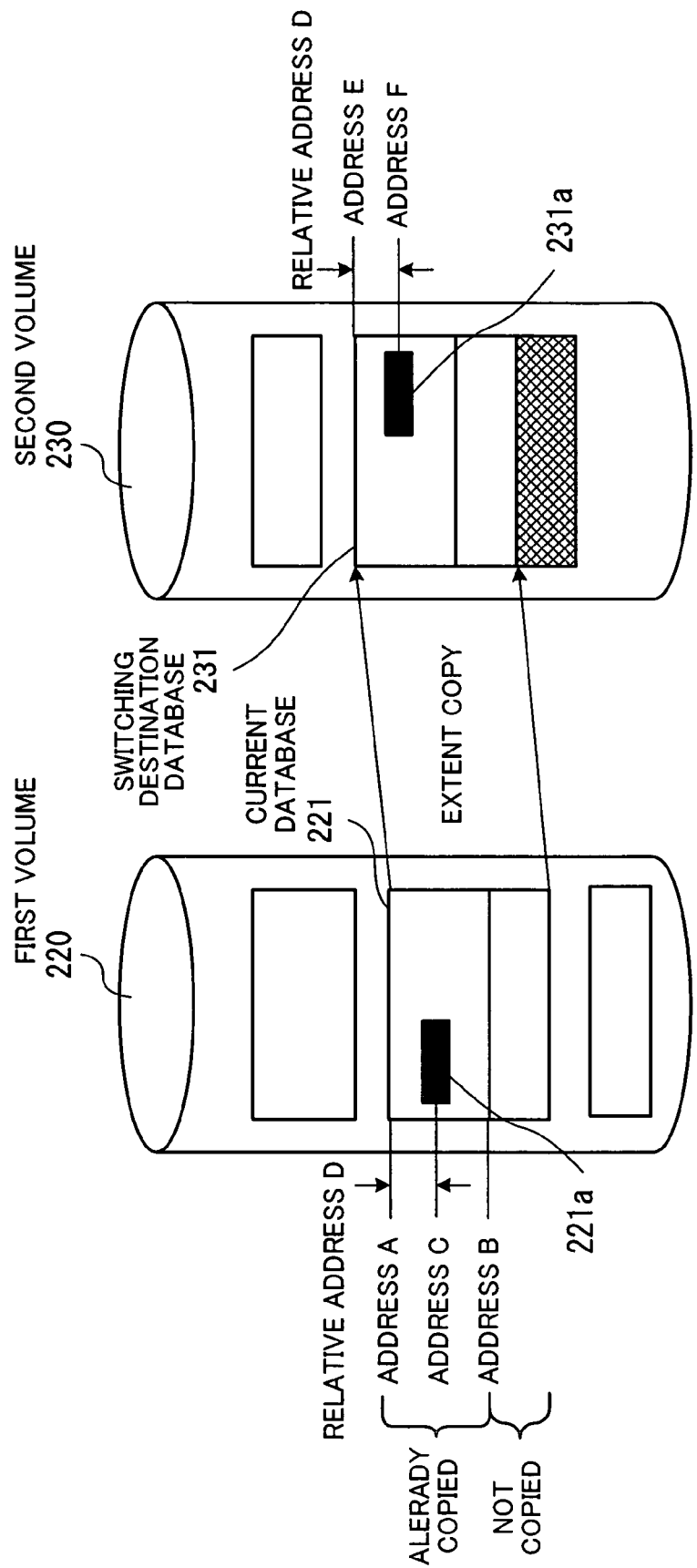
FIG. 7 is a diagram useful in explaining database capacity expansion by extent copy.

FIG. 7 is a diagram useful in explaining database capacity expansion achieved by extent copy. As shown in FIG. 7, in the first volume 220, the current database 221 has been constructed as an extent to be expanded. When the available capacity of the first volume 220 becomes equal to or smaller than a predetermined value, the switching destination database 231 having an expanded capacity is created in the second volume 230. In FIG. 7, an expanded portion of the storage area is shown by hatching. The created switching destination database 231 is initialized, and the associated switching destination schema 112 is incorporated therein.

Then, data within the current database 221 is copied to the switching destination database 231. Copying of data from the current database 221 to the switching destination database 231 is performed in units of tracks in the HDD. In this case, the physical position of data in the first volume 220 and that of the data in the second volume 230 assume different values. Data of the final track of the current database 221 is copied up to an end-of-file (EOF) record (i.e. a record indicative of the end of the data) is reached.

Further, in order for online services to be continuously provided even during data copying, if data in an area targeted by an update I/O has been copied, the data to be updated is reflected in both the current database 221 and the switching destination database 231 in a synchronizing manner.

More specifically, an "address B" set in the final copied data address information 173 and an "address C" designated by the update I/O are compared with each other, and if the "address B" is equal to or larger in value than the "address C", it is determined that the update I/O is for a copied area. On the other hand, if the "address B" is smaller than the "address C", the update I/O is for an uncopied area.

When the update I/O for the copied area is executed, data 221a is written in an area starting with the "address C" in the first volume 220. At the same time, the data 221a is reflected in the switching destination database 231 as well.

To attain the synchronous reflection, a "relative address D" is obtained from the difference between the "address A" indicating the start position of the current database 221 and the "address C" designated by the update I/O. Then, data 231a having the same content as the data 221a is written in an area starting with an "address F" (physical position+relative position) obtained by adding the "relative address D" to an "address E" indicating the start position of the switching destination database 231 in the second volume 230.

Next, a description will be given of the initial copying phase and the equivalence-maintaining phase in the extent copy process.

Figure 8:
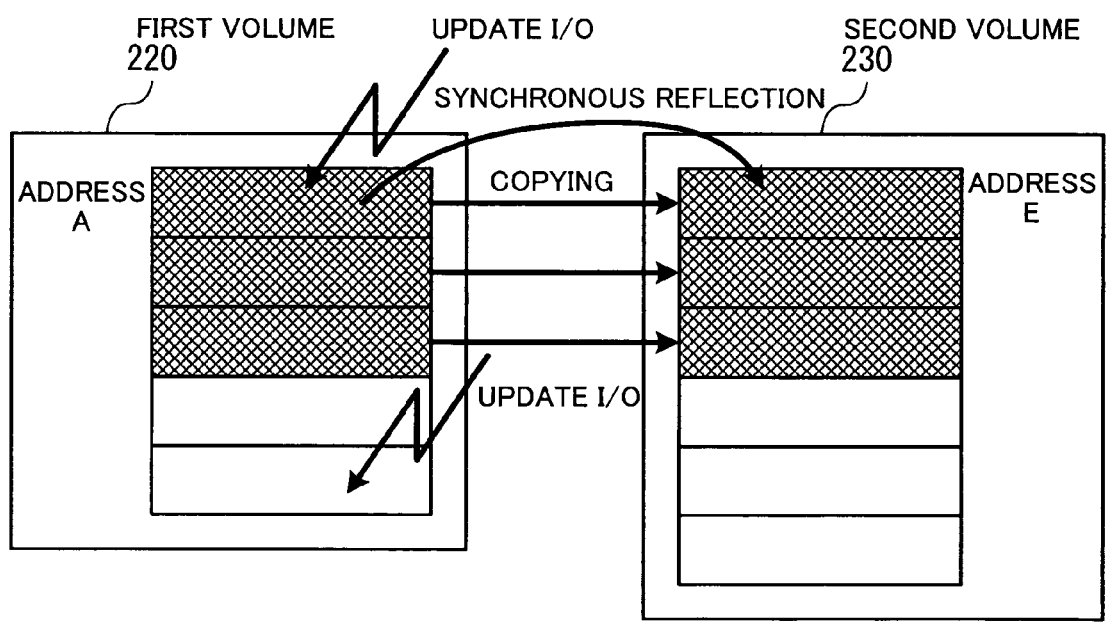
FIG. 8 is a diagram useful in explaining an initial copying phase.

FIG. 8 is a diagram useful in explaining the initial copying phase. In the initial copying phase, data in the first volume 220 are sequentially copied to the second volume 230 from data corresponding to the "address A". In the second volume 230, the data to be copied are sequentially written in an area starting with the "address E". In FIG. 8, copied data is shown by hatching.

When an update I/O targeting a copied area is issued during the initial copying phase, data is written in the first volume 220, and at the same time the same data is reflected in an area in the second volume 230 corresponding to the copied area in the first volume 220 in a synchronizing manner. More specifically, the update I/O targeting the copied area, which is issued during the initial copying phase, is intercepted by the I/O intercepting/reflecting section 152, and an update I/O channel program for an associated area of the switching destination database 231 is prepared by the I/O intercepting/reflecting section 152 and executed. The synchronous reflection is realized by such dual-redundant control.

On the other hand, when an update I/O targeting an uncopied area is issued during the initial copying phase, data is written in the first volume 220 alone.

Figure 9:
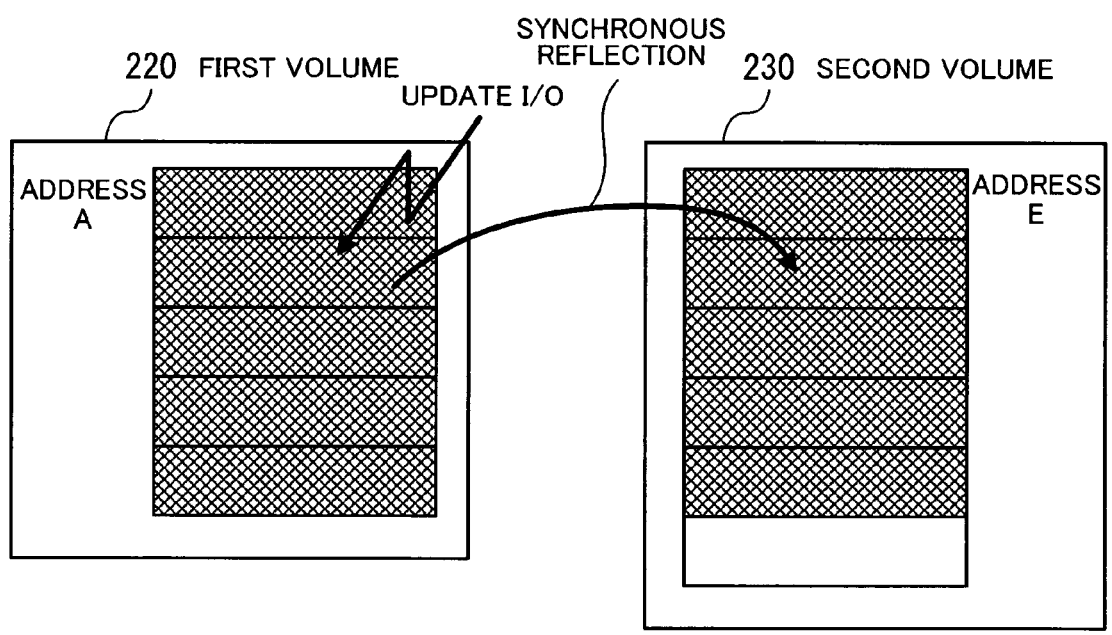
FIG. 9 is a diagram useful in explaining an equivalence-maintaining phase.

FIG. 9 is a diagram useful in explaining the equivalence-maintaining phase. During equivalence maintenance as well, an update I/O issued for the current database 221 is reflected in the switching destination database 231 in a synchronizing manner. After completion of initial copying, equivalence is constantly maintained. As a consequence, instantaneous database switching can be achieved by giving an instruction such as a command to the schema switching section 160.

In the following, the procedure of an extent copy process will be described with reference to a flowchart.

Figure 10:
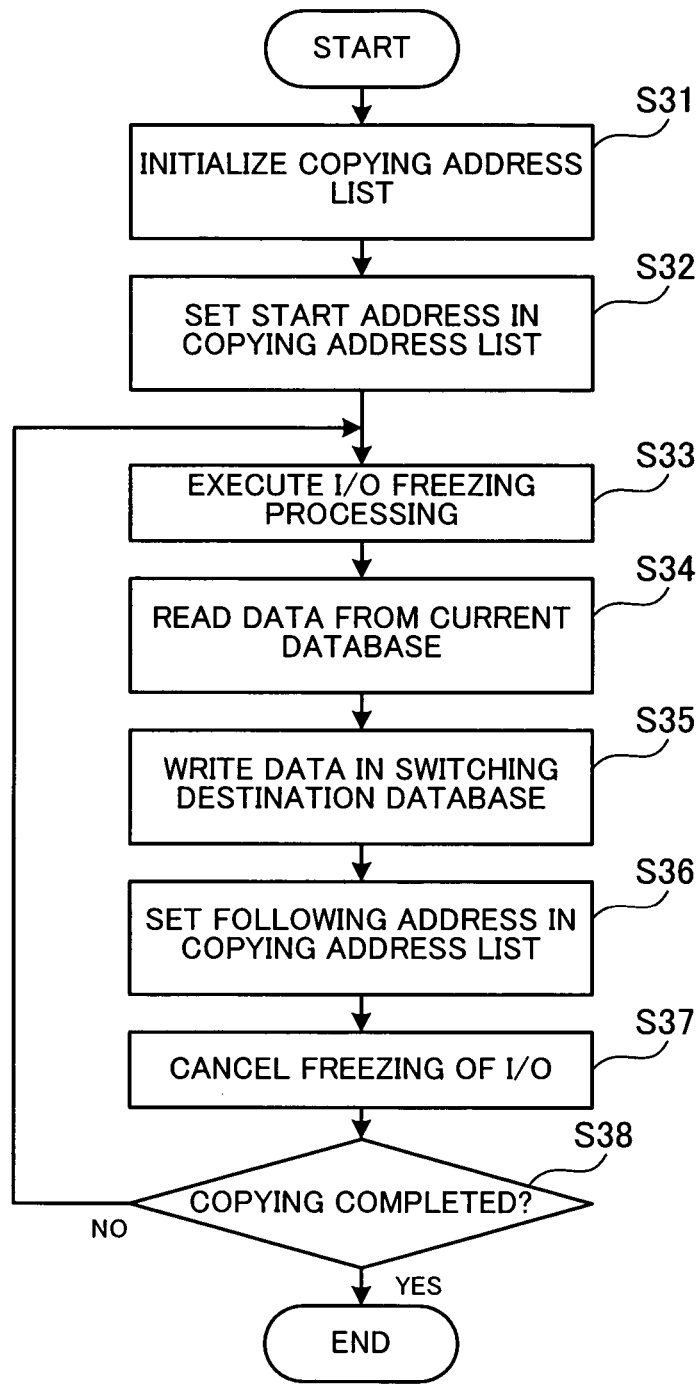
FIG. 10 is a flowchart showing the procedure of the extent copy process.

FIG. 10 is a flowchart showing the procedure of the extent copy process. In the following, the process shown in FIG. 10 will be described in the order of step numbers. It should be noted that the following process is executed by a representative node (the node 100, in the following example) if not otherwise specified.

[Step S31] The data copying section 151 initializes the copying address list 170. More specifically, the data copying section 151 generates the copying address list 170 and sets the start address of the current database 221 and the capacity of the current database 221 as the copy source extent range information 171. Further, the data copying section 151 sets the start address of the switching destination database 231 and the capacity of the switching destination database 231 as the copy destination extent range information 172.

[Step S32] The data copying section 151 sets the final copied data address information 173 in the copying address list 170 to the start address of the current database 221.

[Step S33] The data copying section 151 executes I/O freezing. This processing is executed in all the nodes 100, 100a, ... which form the cluster, after the nodes are made synchronous with each other through the respective inter-cluster communication sections 153.

[Step S34] The data copying section 151 reads data from the current database 221.

[Step S35] The data copying section 151 writes the data read in the step S34 in the switching destination database 231.

[Step S36] The data copying section 151 sets the final copied data address information 173 in the copying address list 170 to the address of data following the copied data.

[Step S37] The data copying section 151 executes cancellation of the I/O freezing. This processing is executed in all the nodes 100, 100a, ... which form the cluster, after the nodes are made synchronous with each other through the respective inter-cluster communication sections 153.

[Step S38] The data copying section 151 determines whether or not copying has been completed. If copying of the EOF file has been completed, it is determined that extent copy has been completed. If the copying has been completed, the process is terminated, whereas if not, the process returns to the step S33.

Next, a description will be given of the procedure of a data update process executed in response to an update I/O issued during copy processing.

Figure 11:
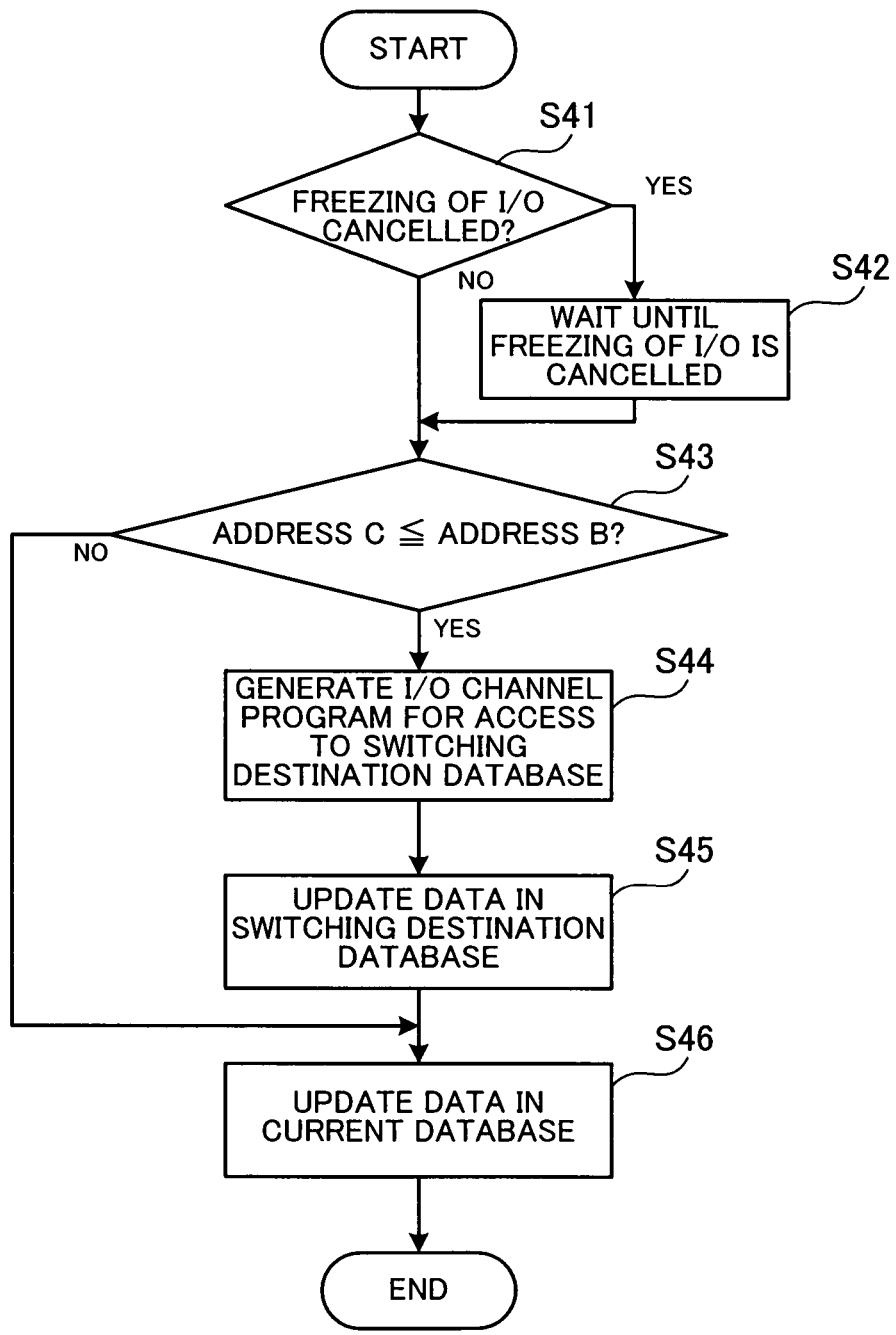
FIG. 11 is a flowchart showing the procedure of a data update process responsive to an update I/O.

FIG. 11 is a flowchart showing the procedure of the data update process responsive to an update I/O. In the following, the process shown in FIG. 11 will be described in the order of step numbers. Although in the present example, the process is executed in the node 100, the same process is also carried out in the other nodes 100a, ... which form the cluster.

[Step S41] When an update I/O is output from the current job 121, the I/O intercepting/reflecting section 152 determines whether or not I/O is frozen. If I/O is frozen, the process proceeds to a step S42, whereas if not, the process proceeds to a step S43.

[Step S42] The I/O intercepting/reflecting section 152 waits until the freezing of I/O is cancelled. After the freezing of I/O is cancelled, the process proceeds to the step S43.

[Step S43] The I/O intercepting/reflecting section 152 performs comparison between the "address C" of the access destination and the "address B" of the final copied data (see FIG. 7). If the "address C" is equal to or smaller in value than the "address B", the process proceeds to a step S44, whereas if the "address C" is larger in value than the "address B", the process proceeds to a step S46.

[Step S44] The I/O intercepting/reflecting section 152 generates the I/O channel program to the switching destination database 231. More specifically, the I/O channel program is generated according to the following procedure (see FIG. 7 about addresses):

The start address "address E" of the switching destination database 231 is acquired.

The "relative address D" indicative of a relative address from the start address "address A" of the current database 221 to the "address C" as an address with which is started data to be accessed is determined.

The "address F" of the switching destination database 231 corresponding to the "address C" of the current database 221 is determined ("address E"+the "relative address D").

The I/O channel program to the switching destination database 231 is generated (by modifying address information in accordance with the switching destination database 231, based on a channel program for the current database 221).

[Step S45] The I/O intercepting/reflecting section 152 executes the data update processing on the switching destination database 231 using the I/O channel program.

[Step S46] The I/O intercepting/reflecting section 152 executes the data update processing on the current database 221.

Thus, it is possible to do an update I/O according to an online electronic message even during extent copy. In the following, a description will be given of differences in handling online electronic messages, which are produced according to the processing status of extent copy.

Figure 12:
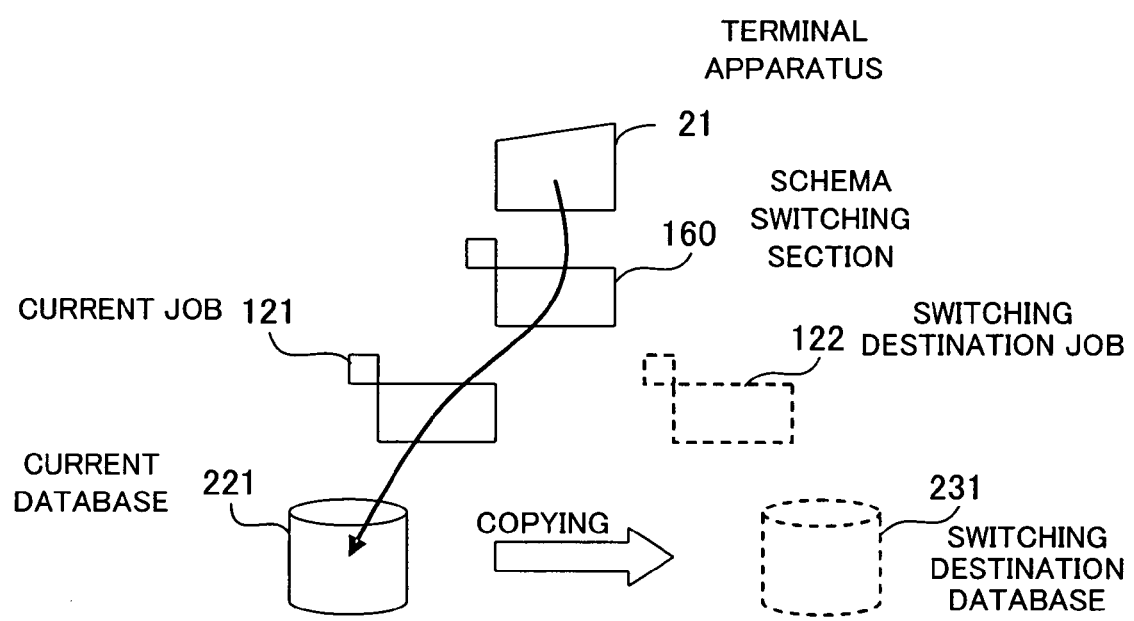
FIG. 12 is a diagram useful in explaining the way of handling an online electronic message before job switching.

FIG. 12 is a diagram useful in explaining the way of handling online electronic messages before job switching. When an online electronic message is output from the terminal apparatus 21 in a state before job switching, the schema switching section 160 distributes the online electronic message to the current job 121. The current job 121 recognizes the data structure of the current database 221 using the current schema 111, and performs I/O access to the current database 221 in response to the online electronic message.

Thereafter, when extent copy is started, the schema switching section 160 starts up the switching destination job 122.

Figure 13:
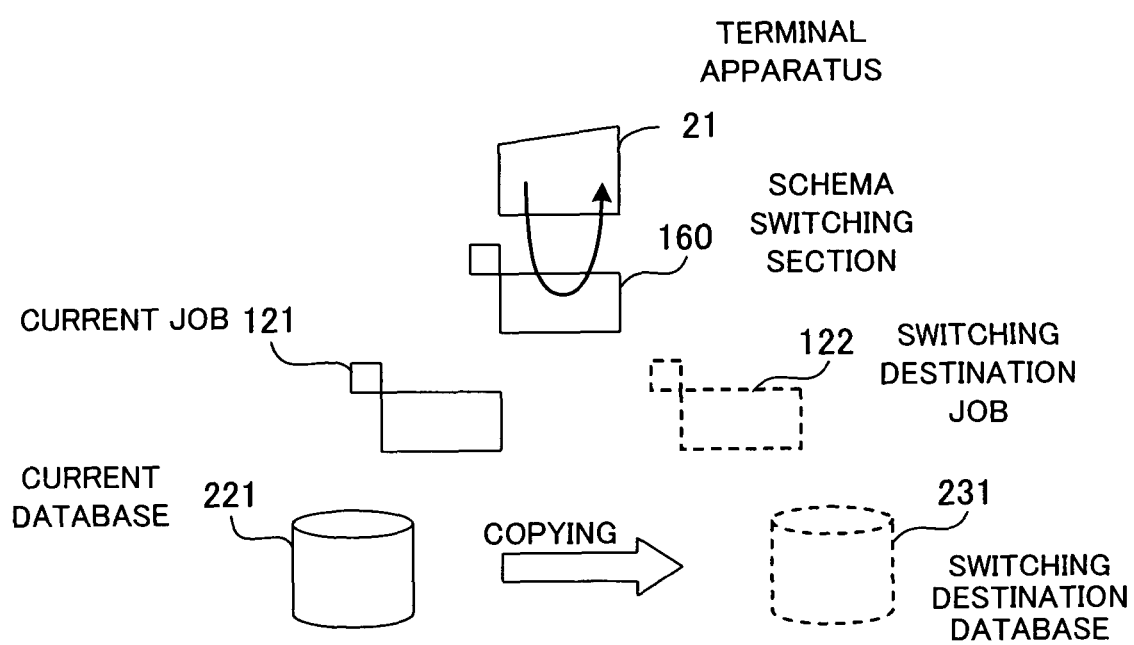
FIG. 13 is a diagram useful in explaining the way of handling an online electronic message during job switching.

FIG. 13 is a diagram useful in explaining the way of handling online electronic messages during job switching. During job switching, the schema switching section 160 confirms that an update I/O for the current database 221 and the switching destination database 231 is being processed in the equivalence-maintaining phase. Then, the schema switching section 160 inhibits distribution of an online electronic message from the terminal apparatus 21. When the distribution of the online electronic message is inhibited, an error response is sent to the terminal apparatus 21 by the schema switching section 160.

Thereafter, the schema switching section 160 cancels the equivalence-maintaining phase of the extent copy and switches the distribution destination of electronic messages from the current job 121 to the switching destination job 122. Then, the schema switching section 160 cancels the inhibition of output of online electronic messages.

Although during switching of the distribution destination of electronic messages, an online electronic message from the terminal apparatus 21 is responded to with an error response, the switching operation is completed in a short time period. Therefore, when the online electronic message is resent from the terminal apparatus 21, at this time point, the switching operation has been completed. Thus, since an error occurs only in short-time online processing, interruption of online services can be practically avoided.

Figure 14:
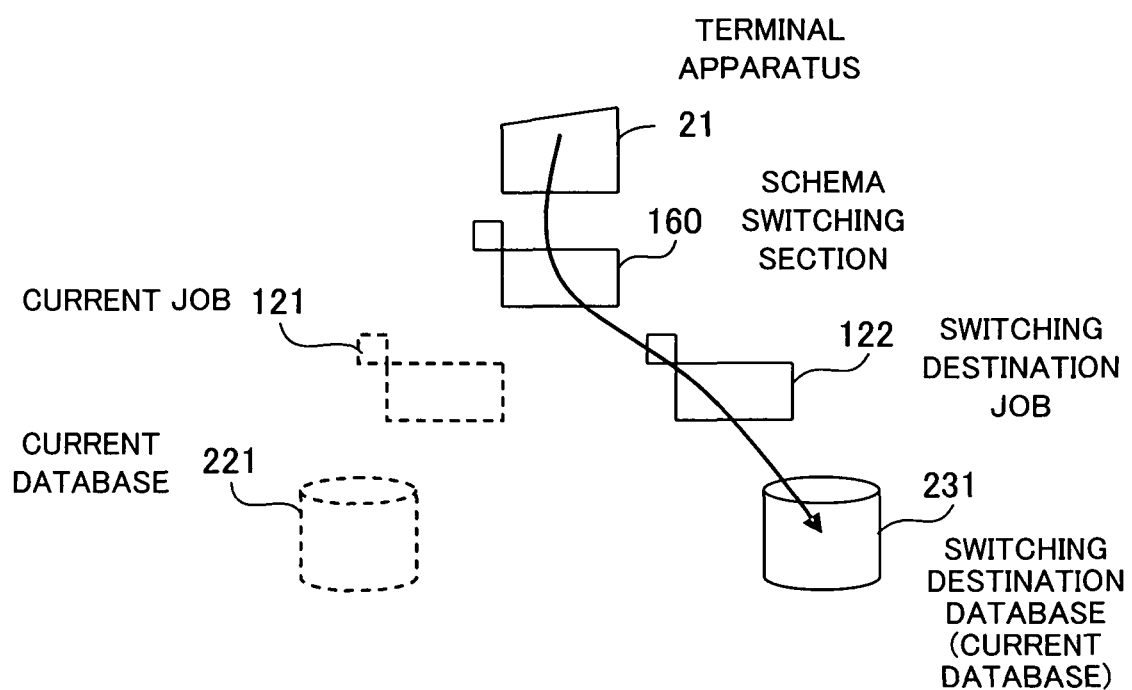
FIG. 14 is a diagram useful in explaining the way of handling an online electronic message after job switching.

FIG. 14 is a diagram useful in explaining the way of handling online electronic messages after job switching. An online electronic message output from the terminal apparatus 21 is distributed to the switching destination job 122 by the schema switching section 160. The switching destination job 122 carries out processing on the switching destination database 231 in response to the online electronic message.

At this time, the operation of the current job 121 is stopped by the schema switching section 160. Further, the current database 221 as the switching source is deleted by the data copying section 151, and the current schema 111 used by the current job 121 is deleted by the schema switching section 160.

As a consequence, the switching destination database 231 comes to be used as the current database from this time on.

As described above, according to the present embodiment, a database can be restructured without depending on the method of managing the database or the data structure of the database. In addition, even a large-scale database can be restructured practically without interrupting online services. More specifically, services are interrupted only during schema switching processing, and therefore short-time service interruption suffices for database restructuring regardless of the scale of the database.

Although in the above described embodiment, the capacity of a database is expanded, the processing of the present embodiment is applicable to cases where a database is restructured in other ways. For example, the processing can be applied to database restructuring performed without changing database capacity and only for the purpose of volume switching (e.g. migration of a database to a volume that can be accessed at a high speed). The processing can also be applied to database restructuring involving division of a database. Further, it is possible to apply the processing to database restructuring involving database integration.

It should be noted that the aforementioned processing capabilities can be realized by a computer. In this case, there is provided a program describing details of capabilities which each node should have. The processing capabilities are realized on a computer by executing the program with the computer. The program describing the details of the capabilities can be recorded in a computer-readable recording medium. The computer-readable recording medium includes a magnetic recording device, an optical disc, a magneto-optical recording medium, and a semiconductor memory. The magnetic recording device includes a hard disk drive (HDD), a flexible disk (FD), and a magnetic tape. The optical disc includes a DVD (Digital Versatile Disc), a DVD-RAM (Random Access Memory), and a CD-ROM (Compact Disc Read Only Memory), and a CD-R (Recordable)/RW (ReWritable). Further, the magneto-optical recording medium includes an MO (Magneto-Optical disc).

To make the program available on the market, portable recording media, such as DVD and CD-ROM, which store the program, are sold. Further, the client program can be stored in a storage device of a server computer connected to a network, and transferred from the server computer to other computers over the network.

A computer which is to execute the program stores the program recorded in a portable recording medium or transferred from the server computer in a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

It should be noted that the present invention is not limited to the above described embodiment, but it can be practiced in various forms, without departing from the spirit and scope thereof.

The present invention is configured such that when data update access designating the physical position of copied data is performed during data copying, the data update processing is executed on both a current database and a switching destination database, and the distribution destination of online electronic messages is switched to switching destination database access section after completion of the copying. This makes it possible to migrate a database without depending on the data structure of the database and practically without interrupting online services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database restructuring apparatus for migrating a current database in a first volume to a second volume, the database restructuring apparatus comprising:
a processor to execute a procedure comprising:
creating a switching destination database in the second volume, and generating a switching destination schema defining a data structure of the switching destination database;
sequentially copying data from an extent range of the current database which is specified by extent range information to the switching destination database, while updating copy address information according to progress of said copying so as to manage which portion of the specified extent range has already been copied;
distributing online electronic messages as data update access to the current database;
specifying, when an online electronic message is input to the current database, a physical position in the current database using a current schema defining a data structure of the current database, and accessing the specified physical position in the current database;
updating, responsive to a data update access received during said copying, both the current database and switching destination database when a target address of the data update access is equal to or smaller than an address indicated by the updated copy address information;
switching, after completion of said copying, a distribution destination of online electronic messages from the current database to the switching destination database, such that only the switching destination database is to be updated when a data update access to copied data is received; and
specifying, when an online electronic message is input to the switching destination database, a physical position in the switching destination database using the switching destination schema, and accessing the specified physical position in the switching destination database.

2. The database restructuring apparatus as claimed in claim 1, wherein:
said copying performs copy processing sequentially from data corresponding to a start address of an area of the current database in the first volume,
when the target address of the received data update access is equal to or smaller than the address indicated by the updated copy address information, said updating determines that the data to be accessed by the received data update access has already been copied, and thus updates both the current database and switching destination database with the received data update access, and
when the target address of the data update access is larger than the address indicated by the updated copy address information, said updating determines that the data to be accessed by the received data update access has not been copied yet, and thus updates only the current database with the received data update access.

3. The database restructuring apparatus as claimed in claim 1, wherein said switching temporarily inhibits acceptance of online electronic messages after completion of said copying until the distribution destination of the online electronic messages is switched.

4. The database restructuring apparatus as claimed in claim 1, wherein said copying freezes access to data during copying, and wherein when access to the data to be accessed is in a frozen state, said updating restarts access processing after cancellation of the frozen state.

5. A computer-readable, non-transitory medium recording a database restructuring program for migrating a current database in a first volume to a second volume, the database restructuring program causing a computer to execute a procedure comprising:

creating a switching destination database in the second volume, and generating a switching destination schema defining a data structure of the switching destination database;

sequentially copying data from an extent range of the current database which is specified by extent range information to the switching destination database, while updating copy address information according to progress of said copying so as to manage which portion of the specified extent range has already been copied;

distributing online electronic messages as data update access to the current database;

specifying, when an online electronic message is input to the current database, a physical position in the current database using a current schema defining a data structure of the current database, and accessing the specified physical position in the current database;

updating, responsive to a data update access received during said copying, both the current database and switching destination database when a target address of the data update access is equal to or smaller than an address indicated by the updated copy address information;

switching, after completion of said copying, a distribution destination of online electronic messages from the current database to the switching destination database, such that only the switching destination database is to be updated when a data update access to copied data is received; and specifying, when an online electronic message is input to the switching destination database, a physical position in the switching destination database using the switching destination schema, and accessing the specified physical position in the switching destination database.

6. A database restructuring method for migrating a current database in a first volume to a second volume, the database restructuring method comprising:

creating a switching destination database in the second volume, and generating a switching destination schema defining a data structure of the switching destination database;

sequentially copying data from an extent range of the current database which is specified by extent range information to the switching destination database, while updating copy address information according to progress of said copying so as to manage which portion of the specified extent range has already been copied;

distributing online electronic messages as data update access to the current database;

specifying, when an online electronic message is input to the current database, a physical position in the current database using a current schema defining a data structure of the current database, and accessing the specified physical position in the current database;

updating, responsive to a data update access received during said copying, both the current database and switching destination database when a target address of the data update access is equal to or smaller than an address indicated by the updated copy address information;

switching, after completion of said copying, a distribution destination of online electronic messages from the current database to the switching destination database, such that only the switching destination database is to be updated when a data update access to copied data is received; and specifying, when an online electronic message is input to the switching destination database, a physical position in the switching destination database using the switching destination schema, and accessing the specified physical position in the switching destination database.

* * * * *